S. A. CHADWELL.
VAPOR TENSION MEASURING APPARATUS.
APPLICATION FILED OCT. 7, 1920.
1,393,942.
Patented Oct. 18, 1921.
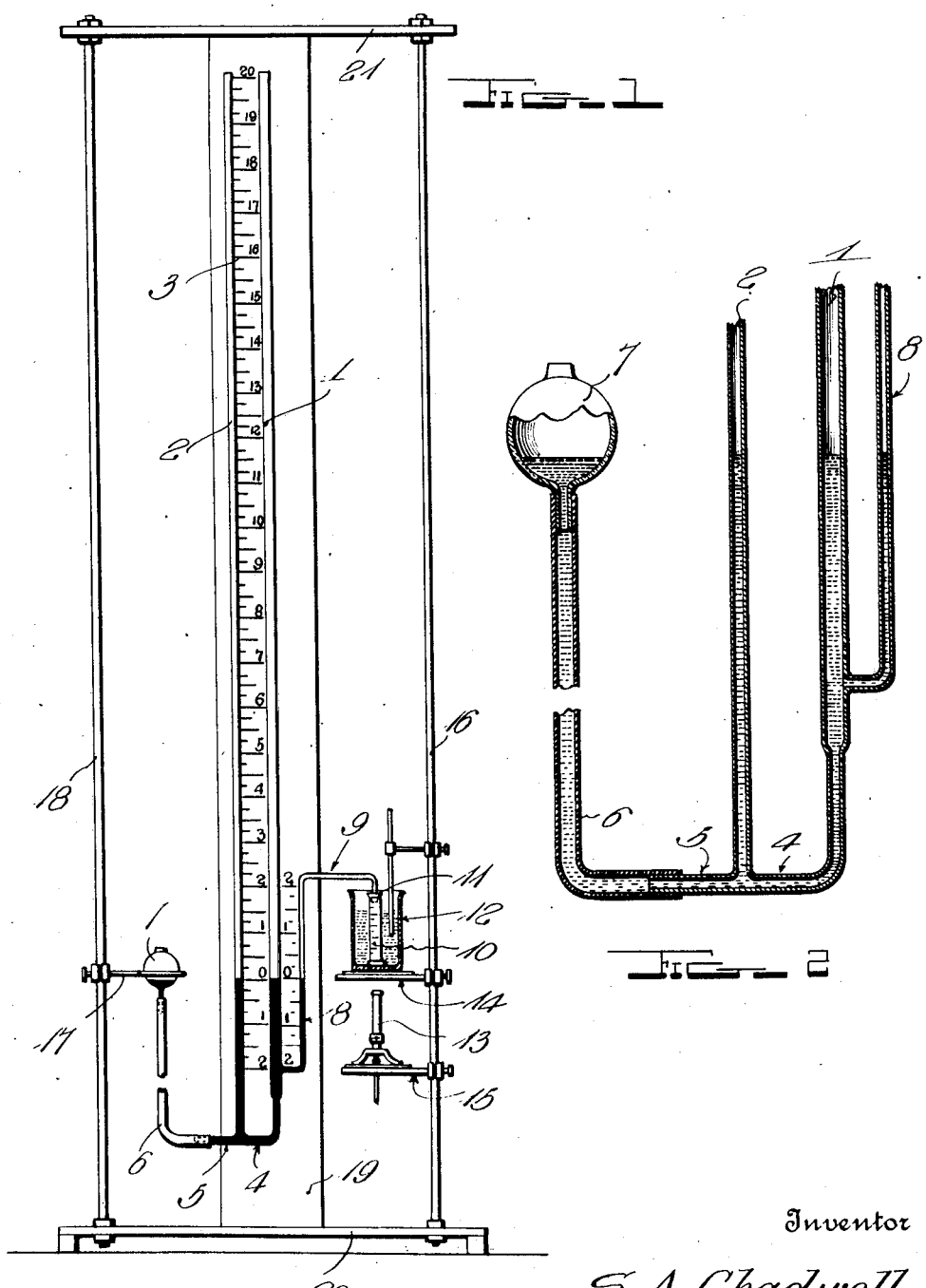
Inventor
S. A. Chadwell
By H. B. Wilson & Co.
Attorneys

UNITED STATES PATENT OFFICE.

SAMUEL A. CHADWELL, OF SUGAR GROVE, OHIO.

VAPOR-TENSION-MEASURING APPARATUS.

1,393,942.

Specification of Letters Patent. Patented Oct. 18, 1921.

Application filed October 7, 1920. Serial No. 415,370.

*To all whom it may concern:*

Be it known that I, SAMUEL A. CHADWELL, a citizen of the United States, residing at Sugar Grove, in the county of Fairfield and State of Ohio, have invented certain new and useful Improvements in Vapor-Tension-Measuring Apparatus; and I do declare the following to be a full, clear, and exact description of the invention, such as will enable others skilled in the art to which it appertains to make and use the same.

My invention relates to improvements in apparatus for measuring vapor tension or pressure of liquids, and one object is to provide an apparatus of this character by whose use the vapor tension may be easily and accurately determined, even from an unusually small sample of the liquid, for instance a sample of gasolene, recovered in making a test.

Another object is to make novel provision for venting the sample after the water bath containing the same has been heated to a predetermined temperature.

Still further objects are to provide an apparatus which may be expeditiously used for weathering a sample at a certain temperature to a certain pressure, and to make novel provision for replacing with mercury any of the sample which may be lost during the weathering process.

With the foregoing in view, the invention resides in the novel construction and association of parts hereinafter described and claimed, the descriptive matter being supplemented by the accompanying drawings.

Figure 1 is a front elevation of an apparatus constructed in accordance with my invention.

Fig. 2 is an enlarged vertical sectional view through the lower portion of the apparatus.

In the drawings, above briefly described, the numerals 1 and 2 designate a pair of vertical gage-tubes which are preferably of slightly different sizes as shown. These tubes are provided with any appropriate scale 3 designating pounds of pressure. At their lower ends, the tubes 1 and 2 communicate with each other by means of a connecting portion 4 and communicating with such portion, is a lateral neck 5 to which the lower end of the flexible tube 6 is connected, the upper end of said tube being in communication with a leveling bottle or mercury reservoir 7 which may be adjusted vertically as required for the purposes hereinafter set forth.

Connected with the gage-tube 1 at a point below the level of mercury in the apparatus, is a connecting tube 8 whose upper end is laterally bent at 9 and is adapted to communicate with the upper end of a test tube or other receptacle 10 containing the sample of liquid whose vapor tension is to be determined. The laterally bent end of the tube 8 may be connected with the receptacle 10 in any preferred manner, but said end is preferably provided with a cork 11 receivable in the upper end of said receptacle as will be seen in Fig. 1. The test tube or the like 10 is receivable in a water receptacle 12 which may be heated by a Bunsen burner or the like 13.

The receptacle 12 and the burner 13 are by preference supported by shelves 14 and 15 respectively, which are adjustable vertically along a rod 16 at one side of the tubes 1 and 2. Similar supporting means 17 is provided for the leveling bottle 7 and such supporting means is vertically adjustable along a vertical rod 18 which is positioned at the side of the gage tubes, opposite the rod 16. The two rods 16 and 18, as well as a suitable setting 19 for the gage tubes and scales, preferably extend between a suitable base 20 and a head plate 21 and while this general arrangement is preferable, it will be understood that any adequate supporting means might be provided for the leveling bottle 7, for the receptacle 12 and for the burner 13.

The operation of the apparatus is as follows: The sample is introduced into the test tube or the like 10 which may well be graduated and is preferably of ten cubic centimeters capacity. The tube 9 is then tightly connected with the upper end of the tube 10 by means of the cork or the like 11 and if the leveling bottle 7 has not been previously adjusted to locate the mercury level at zero in the tubes 1, 2 and 8, this adjustment is now made as shown for instance in Fig. 1. The water in the receptacle 12, in which the tube 10 is immersed, is now heated by the burner 13, and when the proper temperature of heat is attained, the sample is vented by lowering the leveling bottle 7 so that the mercury level recedes below the lower end of the tube 8. It will be observed that when this level is thus lowered, the tube 10 is in communication with the atmosphere through the connecting tube 8 and the gage tube 1. The venting having been accomplished, the leveling bottle is returned to the position at which the mercury level is at zero and when the pressure now becomes constant, it will drive the mercury up the gage tubes so that the vapor tension may be readily determined by comparing the level of mercury in said tubes with the scale 3.

If it is desired to weather a sample at a certain temperature to a certain pressure, the mercury in the tube 2 is brought to the height above the lower end of the tube 8, which corresponds to the pressure desired. The sample is now heated as before so that the generated vapors will drive the mercury up the gage tubes. When the sample has ceased to weather, it is cooled and the loss is determined by the difference in the reading of the graduated tube 10 before and after the test. If, after weathering the sample, the quantity of the latter is decreased, this loss can be replaced by raising the leveling bottle 7 until the mercury is forced to enter the tube 10 through the tube 8. In taking any sample to be tested by the apparatus, precaution is made to allow the usual ten per cent. outage, as is the case in the standard method of determining vapor tension.

Several advantages for the improved apparatus are as follows:

1. The outage or void space above the sample is extremely low and absolutely within control.

2. This space is constant for all readings throughout the range of pressure.

3. The vapor tension of any samples, no matter how small, can be accurately determined by this apparatus, which is especially desirable when but a very small quantity of gasolene, for instance, is recovered in making a test.

4. With this apparatus, it is very convenient to weather samples at given temperatures and pressures, and by this means estimate the approximate percentages of marketable product in the various samples.

Since excellent results may be obtained from the several details shown and described, such details may well be followed. I wish it to be understood however, that within the scope of the invention as claimed, numerous minor changes may well be made, and although I do not wish to restrict the apparatus to the use of two mercury tubes 1 and 2, the second tube is desirable for the following reasons:

First, when the apparatus is being used for weathering the sample, the vapor boiling in the tube 2, makes it impossible to accurately read the pressure from the height of the mercury in this tube.

Second, when testing some liquids at high temperatures, the vapor re-liquefies and remains in the tube 2, which would produce a false reading if this tube only were used.

I claim:

1. A vapor tension measuring apparatus comprising a gage tube adapted to contain a quantity of mercury, a receptacle for a sample of liquid to be tested, a connecting tube for placing the upper end of said receptacle in communication with said gage tube at a point spaced below the mercury level of the latter, means for raising and lowering the level of mercury at will, and means for heating the sample.

2. A vapor tension measuring apparatus comprising a gage tube adapted to contain a quantity of mercury, a receptacle for a sample of liquid to be tested, a connecting tube for placing the upper end of said receptacle in communication with said gage tube at a point spaced below the mercury level of the latter, means for lowering the mercury level below the end of the connecting tube to allow the sample to vent through said connecting tube and the gage tube, and means for heating the sample.

3. A vapor tension measuring apparatus comprising a vertical gage tube, a vertically adjustable leveling bottle adapted to contain mercury, a flexible tube connecting said bottle with the lower end of said gage tube to supply mercury to the latter, a receptacle for a sample of liquid to be tested, a connecting tube for placing the upper end of said receptacle in communication with said gage tube at a point below the mercury level of the latter, and means for heating said receptacle.

4. A vapor tension measuring apparatus comprising a vertical gage tube, a vertically adjustable leveling bottle adapted to contain mercury, a flexible tube connecting said bottle with the lower end of said gage tube to supply mercury to the latter, a receptacle for a sample of liquid to be tested, a connecting tube for placing the upper end of said receptacle in communication with said gage tube at a point below the mercury level of the latter, and means for heating said receptacle, said leveling bottle being downwardly movable to a point to lower the mercury level below the end of the connecting tube, whereby to allow the sample to vent through said connecting tube and the gage tube.

5. A vapor tension measuring apparatus comprising a vertical gage tube, a pair of vertical rods at opposite sides of said gage tube, a leveling bottle adjustable along one of said rods and adapted to contain mercury, a burner supported by the other rod, a water receptacle supported by this rod above the burner and adapted to contain a receptacle holding a sample of liquid, a connecting tube leading upwardly from a point near the lower end of said gage tube and adapted to communicate with the upper end of the receptacle holding the sample, and a flexible tube connecting the lower end of said gage tube with said leveling bottle to receive mercury from the latter, said leveling bottle being movable downwardly to lower the mercury level below the lower end of said connecting tube, allowing the sample to vent through said connecting tube and the gage tube.

In testimony whereof I have hereunto set my hand.

SAMUEL A. CHADWELL.